(12) United States Patent
Xie et al.

(10) Patent No.: US 12,554,671 B2
(45) Date of Patent: Feb. 17, 2026

(54) METHOD AND DEVICE FOR CONFIGURING HOST SYSTEM, APPARATUS, COMPUTING SYSTEM, AND NON-TRANSITORY READABLE STORAGE MEDIUM

(71) Applicant: SUZHOU METABRAIN INTELLIGENT TECHNOLOGY CO., LTD., Jiangsu (CN)

(72) Inventors: Zhiyong Xie, Jiangsu (CN); Rengang Li, Jiangsu (CN); Chuang Zhang, Jiangsu (CN); Guangkui Huang, Jiangsu (CN); Min Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/117,007

(22) PCT Filed: Aug. 20, 2024

(86) PCT No.: PCT/CN2024/113463
§ 371 (c)(1),
(2) Date: Mar. 28, 2025

(87) PCT Pub. No.: WO2025/040098
PCT Pub. Date: Feb. 27, 2025

(65) Prior Publication Data
US 2026/0003819 A1    Jan. 1, 2026

(30) Foreign Application Priority Data

Aug. 22, 2023 (CN) .......................... 202311058974.0

(51) Int. Cl.
*G06F 13/42* (2006.01)
*G06F 9/4401* (2018.01)

(52) U.S. Cl.
CPC ........ *G06F 13/4282* (2013.01); *G06F 9/4411* (2013.01); *G06F 2213/0026* (2013.01)

(58) Field of Classification Search
CPC . G06F 13/4282; G06F 9/4411; H04L 41/0803
See application file for complete search history.

(56) References Cited

U.S. PATENT DOCUMENTS

| 2020/0341930 A1 | 10/2020 | Cannata |
| 2022/0206937 A1 | 6/2022 | Windh |

(Continued)

FOREIGN PATENT DOCUMENTS

| CN | 109768883 A | 5/2019 |
| CN | 110932974 A | 3/2020 |

(Continued)

OTHER PUBLICATIONS

The search report of counterpart PCT application No. PCT/CN2024/113463 issued on Nov. 18, 2024.

(Continued)

*Primary Examiner* — Phong H Dang
(74) *Attorney, Agent, or Firm* — Scully, Scott, Murphy & Presser, P.C.

(57) ABSTRACT

Provided are a configuration method and device for a host system, a computing system, and a storage medium. The method comprises: a target processor is determined from a plurality of devices on a CXL bus according to acquired host configuration information; a target CXL device is determined from CXL devices corresponding to each piece of the device configuration information, to obtain M target CXL devices; and a target CXL switch is configured using the M target CXL devices, the target processor and a shortest connection path between the target CXL device and the target processor, to configure a host system. The embodiments of the present disclosure solve the problem in the (Continued)

related art that a host system cannot be quickly constructed according to computing configuration requirements, thereby achieving the effect of quickly constructing a host system.

20 Claims, 8 Drawing Sheets

(56) References Cited

U.S. PATENT DOCUMENTS

| | | | |
|---|---|---|---|
| 2022/0342841 A1 | 10/2022 | Choudhary | |
| 2024/0378161 A1* | 11/2024 | Kwon | G06F 13/4022 |
| 2024/0422100 A1* | 12/2024 | Helps | H04L 45/76 |
| 2025/0123983 A1* | 4/2025 | Gim | G06F 13/4234 |
| 2025/0202840 A1* | 6/2025 | Hyatt | H04L 49/254 |

FOREIGN PATENT DOCUMENTS

| | | |
|---|---|---|
| CN | 113965471 A | 1/2022 |
| CN | 114363272 A | 4/2022 |
| CN | 115714749 A | 2/2023 |
| CN | 116501681 A | 7/2023 |
| CN | 116781511 A | 9/2023 |
| WO | 2023040447 A1 | 3/2023 |

OTHER PUBLICATIONS

The search report of counterpart CN application No. 202311058974.0 issued on Sep. 20, 2023.

* cited by examiner

METHOD AND DEVICE FOR CONFIGURING HOST SYSTEM, APPARATUS, COMPUTING SYSTEM, AND NON-TRANSITORY READABLE STORAGE MEDIUM

CROSS-REFERENCE TO RELATED APPLICATIONS

The present disclosure is a national stage filing under 35 U.S.C. § 371 of international application number PCT/CN2024/113463, filed Aug. 20, 2024, which claims priority to Chinese Patent Application no. 202311058974.0, to the China National Intellectual Property Administration on Aug. 22, 2023 and entitled "Method and Device for Configuring Host System, Apparatus, Computing System, and Non-Transitory Readable Storage Medium", which is incorporated herein by reference in its entirety.

TECHNICAL FIELD

Embodiments of the present disclosure relate to the field of computers, and in particular, to a method and device for configuring a host system, an apparatus, a computing system, and a Non-Transitory readable storage medium.

BACKGROUND

A Computer Express Link (CXL) is a brand-new interconnection technology standard, which enables high-efficient and high-speed interconnection CPUs, GPUs, FPGAs, various accelerators, and memory devices. The CXL provides a low-latency and high-bandwidth path for accelerators to access the system or for the system to access CXL devices. The CXL architecture supports rack-scale construction of flexible, combinable computing systems to meet the growing computational demands in fields such as machine learning or artificial intelligence, drug discovery, agriculture and life sciences, materials science, and climate modeling.

In existing technology, some control command sets for CXL devices and CXL switches have been introduced. According to the specification, users can design their own device connection schemes and then send commands to the CXL devices and CXL switches on the basis of the defined control command sets, to construct a computing system that meets their requirements. However, the current research on how to automatically search for a suitable device to construct a computing system according to computing configuration requirements is relatively rare. The method for manually configuring a computing system by users is time-consuming and labor-intensive, requiring users to be meticulous and possess a relatively high level of technical expertise.

SUMMARY

Embodiments of the present disclosure provide a method and device for configuring a host system, an apparatus, a computing system, and a Non-Transitory readable storage medium, so as to at least solve the problem in the related art that configuration of a computing system is inefficient.

According to a first aspect of embodiments of the present disclosure, provided is a configuration method for a host system, comprising: according to acquired host configuration information, a target processor is determined from a plurality of devices on a CXL bus, wherein the plurality of devices are devices supporting an open interconnect standard CXL protocol, and the target processor is a device in an idle state among the plurality of devices; a CXL device corresponding to each piece of the device configuration information is determined from the plurality of devices according to M pieces of device configuration information included in the host configuration information, wherein one piece of device configuration information corresponds to the plurality of CXL devices, the CXL device is a device in an idle state among the plurality of devices, and M is a natural number greater than or equal to 1; a target CXL device is determined from CXL devices corresponding to each piece of the device configuration information, to obtain M target CXL devices, wherein in a connection path between a CXL device corresponding to each piece of configuration information and the target processor, the determined connection path between the target CXL device and the target processor is the shortest; and a target CXL switch is configured using the M target CXL devices, the target processor and a shortest connection path between the target CXL device and the target processor, to configure a host system, the target CXL switch being a switch supporting the open interconnect standard CXL protocol.

According to a second aspect of the embodiments of the present disclosure, provided is a computing system, the computing system comprising a plurality of host systems, and the host systems are determined by means of the described method.

According to a third aspect of the embodiments of the present disclosure, provided is a configuration apparatus for a host system, comprising: a first determination module, configured to determine, according to acquired host configuration information, a target processor from a plurality of devices on a CXL bus, wherein the plurality of devices are devices supporting an open interconnect standard CXL protocol, and the target processor is a device in an idle state among the plurality of devices; a second determination module, configured to determine a CXL device corresponding to each piece of the device configuration information from the plurality of devices, according to M pieces of device configuration information included in the host configuration information, wherein one piece of device configuration information corresponds to the plurality of CXL devices, the CXL device is a device in an idle state among the plurality of devices, and M is a natural number greater than or equal to 1; a third determination module, configured to determine a target CXL device from CXL devices corresponding to each piece of the device configuration information, to obtain M target CXL devices, wherein in a connection path between a CXL device corresponding to each piece of configuration information and the target processor, the determined connection path between the target CXL device and the target processor is the shortest; and a first configuration module, configured to configure a target CXL switch using the M target CXL devices, the target processor and a shortest connection path between the target CXL device and the target processor, to configure a host system, the target CXL switch being a switch supporting the open interconnect standard CXL protocol.

According to a fourth aspect of the embodiments of the present disclosure, provided is a non-transitory computer readable storage medium, wherein the non-transitory computer readable storage medium stores a computer program, the computer program is configured to execute, when running, the steps in any one of the described method embodiments.

According to a fifth aspect of the embodiments of the present disclosure, also provided is an electronic device, comprising a memory and a processor, wherein the memory stores a computer program, and the processor is configured to execute the computer program to perform the steps in any one of the method.

According to the embodiments of the present disclosure, since a target processor is determined from a plurality of devices on a CXL bus according to acquired host configuration information; a CXL device corresponding to each piece of the device configuration information is determined from the plurality of devices according to M pieces of device configuration information included in the host configuration information; a target CXL device is determined from CXL devices corresponding to each piece of device configuration information, to obtain M target CXL devices; and a target CXL switch is configured using the M target CXL devices, the target processor and a shortest connection path between the target CXL device and the target processor, to configure a host system. In this way, a proper device is automatically searched for based on a configuration requirement to construct a host system, thereby achieving an objective of automatically constructing a computing system without the need for manual configuration by users. Therefore, the problem in the related art that the efficiency of configuring a computing system is low can be solved, achieving the effect of improving the efficiency of configuring a computing system.

DETAILED DESCRIPTION OF THE EMBODIMENTS

The embodiments of the present disclosure are described in detail with reference to the accompanying drawings and in conjunction with the embodiments.

It is to be noted that terms "first", "second" and the like in the description, claims and the above-mentioned drawings of the embodiments of the present disclosure are used for distinguishing similar objects rather than describing a specific sequence or a precedence order.

The related art in the present embodiment is explained below:

FPGA: Field-Programmable Gate Array;
GPU: Graphic Processing Unit;
CXL SW: Compute Express Link Switch;
CPU: Central Processing Unit;
CXL: Computer Express Link, which is a brand-new interconnection technology standard, enabling high-efficient and high-speed interconnection CPUs, GPUs, FPGAs, various accelerators, and memory devices. The CXL provides a low-latency and high-bandwidth path for accelerators to access the system or for the system to access CXL devices. The CXL architecture supports rack-scale construction of flexible, composable computing systems to meet the growing computational demands in fields such as machine learning or artificial intelligence, drug discovery, agriculture and life sciences, materials science, and climate modeling.
PPB: Peripheral Component Interconnect Bridge, which is a Peripheral Component Interconnect Standard (PCI*-PCI) bridge inside a CXL Switch, and a port connected to the PPB can be disconnected or connected to a CXL assembly;
vPPB: a virtual PCI*-PCI bridge inside a CXL Switch, which may be bound to a port, and the port may be disconnected or connected to a CXL assembly.

Figure 1:
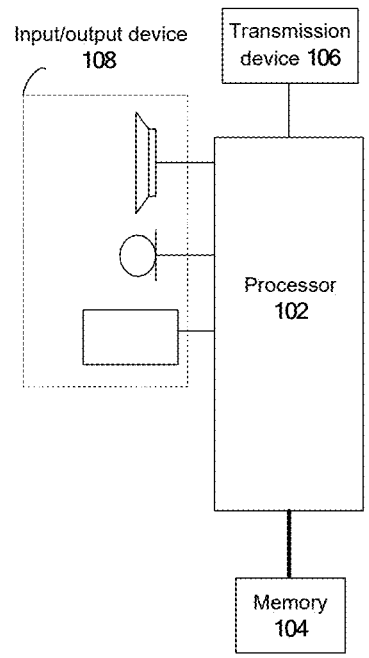
FIG. 1 is a hardware structure block diagram of a mobile terminal for a method for configuring a host system according to an embodiment of the present disclosure.

The method embodiment provided in the embodiment I of the present disclosure may be executed in a mobile terminal, a computer terminal, or a similar computing device. By taking running on a mobile terminal as an example. FIG. 1 is a hardware structure block diagram of a mobile terminal for a method for configuring a host system according to an embodiment of the present disclosure. As shown in FIG. 1, the mobile terminal may include one or more (only one is shown in FIG. 1) processors 102 (the processors 102 may include, but are not limited to, a microprocessor MCU or a processing device such as a programmable logic device FPGA) and a memory 104 configured to store data, wherein the mobile terminal can further include a transmission device 106 for a communication function and an input/output device 108. Those ordinarily skilled in the art can appreciate that the structure shown in FIG. 1 is for illustrative purposes only, but not limit the structure of the mobile terminal. For example, the mobile terminal may also include more or fewer components than that shown in FIG. 1, or have a different configuration than that shown in FIG. 1.

The memory 104 may be configured to store a computer program, for example, a software program and a module of disclosure software, such as a computer program corresponding to the method for configuring a host system in the embodiments of the present disclosure. The processor 102 runs the computer program stored in the memory 104, so as to execute various function disclosures and data processing, that is, to implement the foregoing method. The memory 104 may include a high-speed random access memory, and may also include a non-transitory memory, such as one or more magnetic storage apparatuses, flash memories, or other non-transitory solid-state memories. In some instances, the memory 104 includes memories remotely arranged with respect to the processor 102, and these remote memories may be connected to the mobile terminal over a network. Examples of the network above includes, but is not limited to, an Internet, intranets, a local area network, a mobile communication network, and combinations thereof.

The transmission device 106 is configured to receive or transmit data by a network. Examples of the described network may include a wireless network provided by a communication provider of the mobile terminal. In one example, the transmission device 106 includes a network interface controller (NIC) which may be connected to other network devices by means of a base station, thereby being able to communicate with the Internet. In one example, the transmission device 106 may be a radio frequency (RF) module for communicating wirelessly with the Internet.

Figure 2:
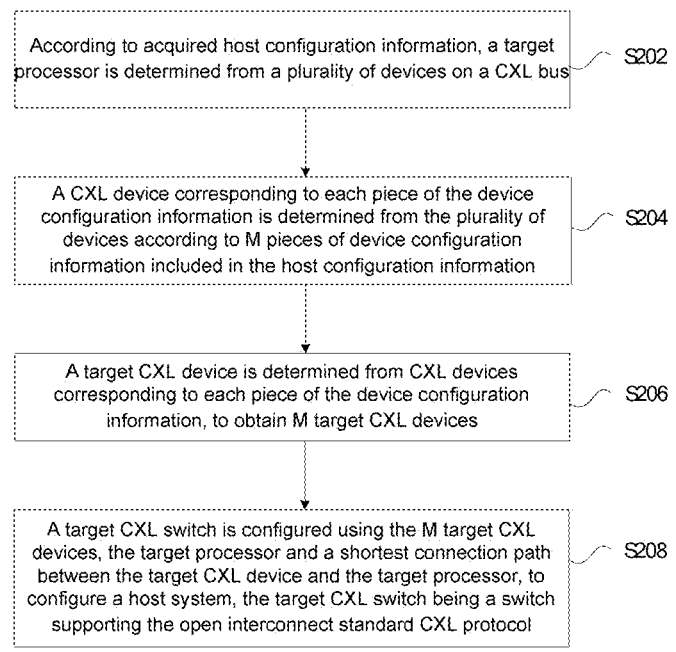
FIG. 2 is a flowchart of a configuration method for a host system according to an embodiment of the present disclosure.

A method for configuring a host system is provided in the present embodiment. FIG. 2 is a flowchart of a configuration method for a host system according to an embodiment of the present disclosure.

As shown in FIG. 2, the flow includes the following steps:

step S202: according to acquired host configuration information, a target processor is determined from a plurality of devices on a CXL bus, wherein the plurality of devices are devices supporting an open interconnect standard CXL protocol, and the target processor is a device in an idle state among the plurality of devices;

step S204: a CXL device corresponding to each piece of the device configuration information is determined from the plurality of devices according to M pieces of device configuration information included in the host configuration information, wherein one piece of device configuration information corresponds to the plurality of CXL devices, the CXL device is a device in an idle state among the plurality of devices, and M is a natural number greater than or equal to 1;

step S206: a target CXL device is determined from CXL devices corresponding to each piece of the device configuration information, to obtain M target CXL devices, wherein in a connection path between a CXL device corresponding to each piece of configuration information and the target processor, the determined connection path between the target CXL device and the target processor is the shortest; and step S208: a target CXL switch is configured using the M target CXL devices, the target processor and a shortest connection path between the target CXL device and the target processor, to configure a host system, the target CXL switch being a switch supporting the open interconnect standard CXL protocol.

The present embodiment may be applied to scenarios where devices need to be selected to configure computing systems, such as data computing centers, high-performance computing, and artificial intelligence cloud computing.

The execution subject of the foregoing steps may be a processor, or a processor or a processing device separately provided relative to a terminal or a server, but is not limited thereto.

Figure 3:
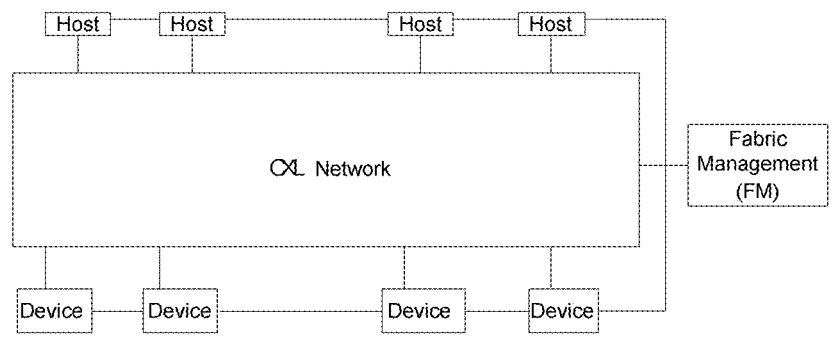
FIG. 3 is a diagram of a connection relationship of devices according to an embodiment of the present disclosure.

In the present embodiment, the target CXL switch may be provided on a CXL bus supporting the CXL protocol, and the CXL bus includes a high-speed interconnect architecture CXL Fabric. The CXL Fabric may be connected to a plurality of CXL devices and a plurality of hosts to form a computing platform that shares resources. The plurality of CXL switches included in the CXL Fabric provide an extensible and flexible infrastructure for the CXL devices, and communication and data transmission between the devices can be implemented by providing a high-speed point-to-point connection between the CXL devices. The CXL device may be a host or a device such as a processor and a memory module. For example, as shown in FIG. 3, there are a plurality of hosts with a CXL root and a plurality of CXL devices, which are connected with each other by means of a CXL Fabric network, and the CXL Fabric network includes a plurality of CXL switches connected with each other. A port of the CXL switch may be connected to a host with a CXL root or a CXL device. Different host systems can be built by configuring the CXL switches reasonably. In addition, there is also a Fabric Management (FM) unit which is connected to the CXL device and the CXL host by means of a management network, and the management network supports transmission protocols such as a System Management Bus (SMBus), an Inter-Integrated Circuit I2C, an Improved Inter Integrated Circuit (I3C) and an Ethernet.

Figure 4:
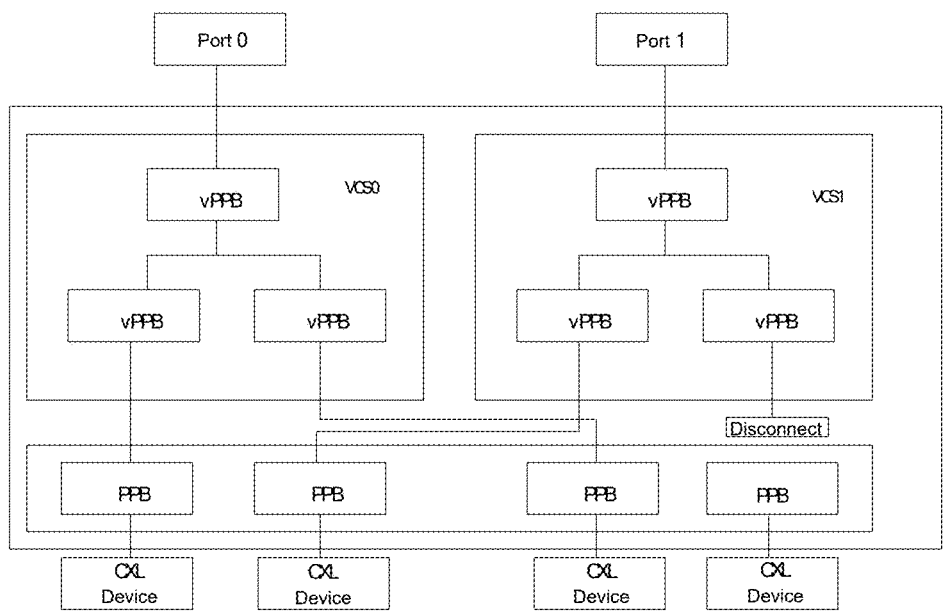
FIG. 4 is a schematic structural diagram of a CXL switch according to an embodiment of the present disclosure.

Optionally, a CXL Fabric network includes one or more CXL switches. The structure of the CXL switch is shown in FIG. 4; one or more virtual switches (VCS) are deployed in the CXL switch; virtual ports are allowed to be connected to a plurality of CXL devices; and the connection of each virtual port can be configured according to needs, thereby realizing the function of CXL data exchange and constructing different computing systems.

According to the described steps, since a target processor is determined from a plurality of devices on a CXL bus according to acquired host configuration information; a CXL device corresponding to each piece of the device configuration information is determined from the plurality of devices according to M pieces of device configuration information included in the host configuration information; a target CXL device is determined from CXL devices corresponding to each piece of device configuration information, to obtain M target CXL devices; and a target CXL switch is configured using the M target CXL devices, the target processor and a shortest connection path between the target CXL device and the target processor. In this way, a proper device is automatically searched for based on a configuration requirement to construct a host system, thereby achieving an objective of automatically constructing a computing system without the need for manual configuration by users. Therefore, the problem in the related art that the efficiency of configuring a computing system is low can be solved, achieving the effect of improving the efficiency of configuring a computing system.

In an exemplary embodiment, according to acquired host configuration information, a target processor is determined from a plurality of devices on a CXL bus comprises: processor information is acquired from the host configuration information; a device information table is searched for device information matching the processor information, wherein the device information table comprises device information of the plurality of devices; and the target processor is determined from the plurality of devices according to the device information matching the processor information.

Optionally, in the present embodiment, the host configuration information may be any configuration information in preset configuration information of a computing system. The configuration information of the computing system is stored in a memory or a Flash or a magnetic disk. The host configuration information includes a plurality of devices required for configuration, for example, a host system needs to configure devices such as a CPU, a GPU and a memory, and the devices are sorted according to importance. The CPU is sorted as the first node; then the identifier information of the manufacturer of each device, the identifier information of each device, and the classification information (a manufacturer Identity Document (ID), a product ID, and a device classification ID) of the device, and other necessary device information are matched with the device information of the CPU; a matched CXL device that has not yet been configured is selected as a target CPU of the host system; and then the target CPU is marked in the device information table as being configured.

The device information table includes information of a plurality of CPUs and information of a plurality of CXL devices. In the present embodiment, the configuration requirement of a user may be acquired in advance by means of host configuration information, and a host system is constructed according to the requirement, thereby improving configuration efficiency of the system.

In an exemplary embodiment, a CXL device corresponding to each piece of the device configuration information is determined from the plurality of devices according to M pieces of device configuration information included in the host configuration information comprises: the device information table is searched for device information matching each piece of the device configuration information, wherein the device information table comprises device information of the plurality of devices; and a corresponding CXL device is determined from the plurality of devices according to the device information matching each piece of the device configuration information.

Optionally, in the present embodiment, the information of devices such as the CXL devices, the processor and the CXL switch is acquired by the FM by means of the Network Controller Sideband Interface protocol (MCTP) or other protocols; the acquired device information is stored by means of the established device information table. Information of each processor, information of each CXL device and device information of each switch all comprise at least one of the following: identifier information of a manufacturer, identifier information of the device, and classification information of the device. In the present embodiment, the device information is stored using the device information table, so that the device information can be quickly found, thereby improving the efficiency of constructing a host system.

In an exemplary embodiment, a target CXL device is determined from CXL devices corresponding to each piece of the device configuration information, to obtain M target CXL devices comprises: a node connection diagram between the CXL device corresponding to each piece of the device configuration information and the target processor is configured, wherein the node connection diagram comprises a connection relationship and a connection port between the CXL device and the target processor; and a target CXL device is determined from the CXL devices corresponding to each piece of the device configuration information using the node connection diagram, and obtaining M target CXL devices.

Optionally, in the present embodiment, the node connection diagram is a directed graph, the vertexes in the node connection diagram comprise the CXL devices and the target processor, the edge weights of edges in the node connection diagram are preset values, and the edges are used for connecting the CXL devices and the target processor. Two ends of the node connection diagram are a plurality of CXL devices and target processors, and the middle portion comprises various target virtual ports. All connected devices are displayed by means of a directed graph, and the shortest connection path is selected from a plurality of paths, such that optimal devices are be determined to form a host system.

Optionally, a node connection diagram between a CXL device corresponding to configuration information of each device and a target processor is configured comprises: a first CXL switch corresponding to the target processor is determined, wherein the first CXL switch is one of a plurality of target CXL switches connected on a CXL bus, and the target CXL switch is a switch supporting an open interconnect standard CXL protocol; a second CXL switch corresponding to each of the CXL devices is determined, wherein the second CXL switch is one switch among the plurality of target CXL switches; a real-time node adjacency table is searched for a first connection relationship between the target processor and the first CXL switch, a second connection relationship between each of the CXL devices and a corresponding second CXL switch, and a third connection relationship between the first CXL switch and a second CXL switch corresponding to each of the CXL devices; a port configuration information table of the first CXL switch is searched for first port information of a connection between the target processor and the first CXL switch; a port configuration information table of each of the CXL devices and a corresponding second CXL switch is searched for second port information of a connection between each of the CXL devices and the corresponding second CXL switch; and a node connection diagram between the CXL device and the target processor corresponding to each piece of the device configuration information is configured using the first connection relationship, the second connection relationship, the third connection relationship, the first port information and the second port information.

Optionally, the first port information comprises first physical port information and first virtual port information of the connection between the target processor and the first CXL switch, and the first virtual port information is port information of a virtual port in a virtual CXL switch provided in the first CXL switch.

Optionally, the second port information comprises second physical port information and second virtual port information of the connection between each of the CXL devices and the corresponding second CXL switch, and the second virtual port information is port information of a virtual port in a virtual CXL switch provided in the second CXL switch.

Optionally, the target CXL device is determined from CXL devices corresponding to each piece of the device configuration information using the node connection diagram, to obtain M target CXL devices comprises: a shortest connection path is calculated among a plurality of connection paths in the node connection diagram corresponding to each piece of the device configuration information; and one target CXL device is determined from the shortest connection path corresponding to each piece of the device configuration information, to obtain M target CXL devices. The shortest connection path can be calculated among a plurality of connection paths in the node connection diagram corresponding to each piece of the device configuration information according to a Dijkstra algorithm or another algorithms. In the present embodiment, the shortest connection path may also be determined by comparing path distances, and the shortest connection path between the CXL device and the target processor may be recorded. After the host system is configured, the real-time node adjacency table is updated according to the shortest connection path.

In one exemplary embodiment, the target CXL switch is configured using the M target CXL devices, the target processor and a shortest connection path between the target CXL device and the target processor, to configure the host system comprises: a configuration instruction is sent to the first CXL switch corresponding to the target processor, wherein the configuration instruction comprises the shortest connection path between the target CXL device and the target processor, the first CXL switch is one of the plurality of target CXL switches provided in the CXL bus, and the plurality of the target CXL switches are switches supporting the open interconnect standard CXL protocol; and the shortest connection path is connected to by means of the first CXL switch, to configure the host system.

In an exemplary embodiment, before the target processor is determined from the plurality of devices on the CXL bus according to the acquired host configuration information, the method further comprises: port information of a port provided in each of the plurality of target CXL switches is acquired, wherein the plurality of target CXL switches are switches supporting the open interconnect standard CXL protocol, the devices are allowed to be connected to the target CXL switches, and the plurality of target CXL switches are allowed to be connected to each other; and a device information table is constructed using the device information of the plurality of CXL devices and the switch information of the plurality of target CXL switches. In the present embodiment, the device information is stored using the device information table, so that the device information can be quickly found, thereby facilitating fast construction of a host system. The device information table is used to find a plurality of CXL devices, so that optimal devices can be selected from the plurality of CXL devices, thereby improving the computing performance of the host system.

Optionally, the device information of each device comprises at least one of the following: identifier information of the manufacturer of the device, identifier information of the device, and classification information of the device; the switch information of each of the target CXL switches comprises at least one of the following: identifier information of a manufacturer of each target CXL switch, identifier information of each target CXL switch, and classification information of each target CXL switch.

In an exemplary embodiment, before the target processor is determined from the plurality of devices on the CXL bus according to the acquired host configuration information, the method further comprises: an information acquisition instruction is sent to the plurality of target CXL switches; CXL connection information sent by each target CXL switch is received, wherein the CXL connection information comprises connection relationship information between each target CXL switch and the device; and a node adjacency table is constructed using the CXL connection information sent by each target CXL switch, wherein the node adjacency table comprises a connection relationship between each device and the corresponding target CXL switch.

Figure 5:
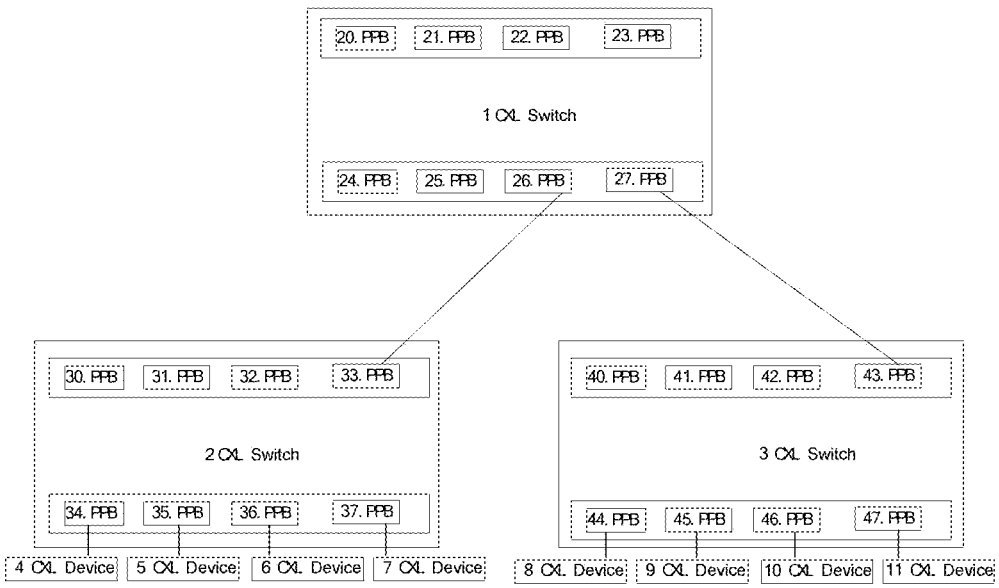
FIG. 5 is a schematic diagram of a node connection relationship according to an embodiment of the present disclosure.
Figure 6:
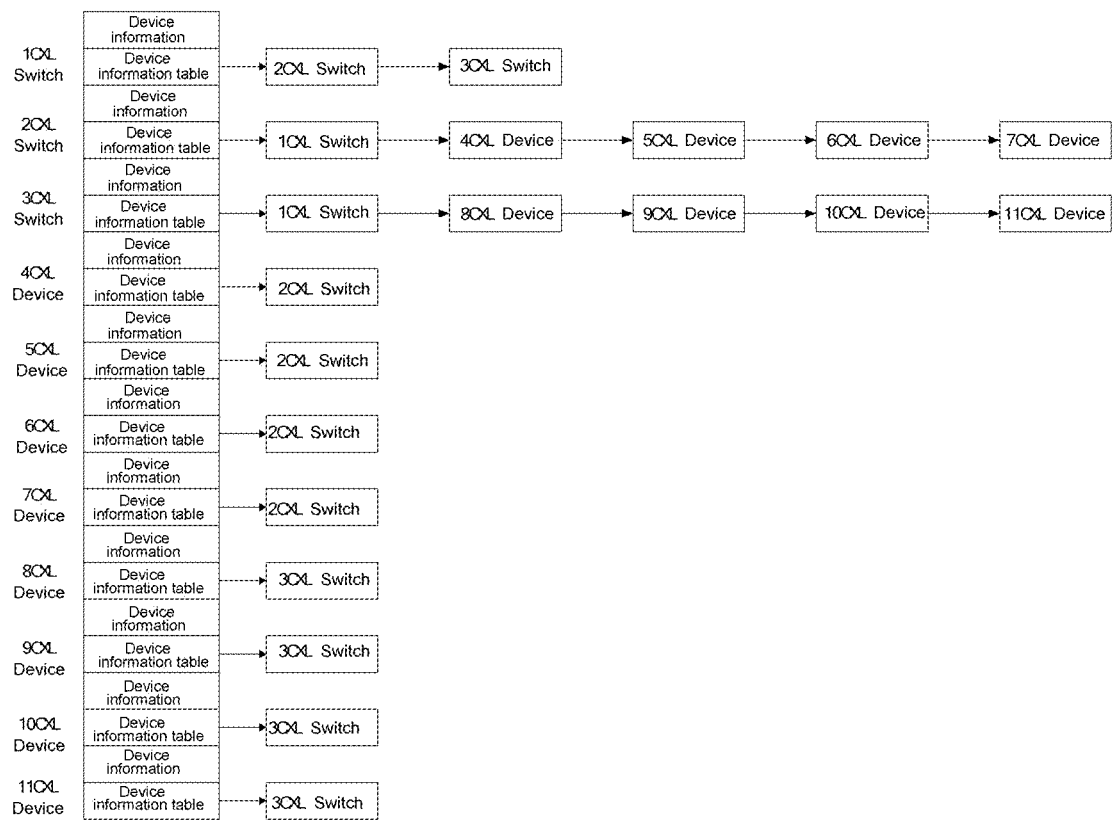
FIG. 6 is a schematic diagram of a node adjacency table according to an embodiment of the present disclosure.

Optionally, as shown in FIG. 5, it is a schematic diagram of a connection relationship of nodes between three target CXL switches, the method comprises: an acquisition command is sent to each target CXL switch on a network connection device by means of the FM; information such as the configuration, ports and devices connected to the ports of each target CXL switch is acquired; and a node adjacency table of the plurality of target CXL switches is established, the node adjacency table being used for recording connection situations between devices. Optionally, the structure of the node adjacency table is shown in FIG. 6, wherein the node adjacency table includes device information of each CXL device and the reference signs of the connected devices, referring to FIG. 5, 1 represents a CXL switch 1; 2 represents a CXL switch 2; 3 represents a CXL switch 3; 4 represents a CXL device 4; 5 represents a CXL device 5; 6 represents a CXL device 6; 7 represents a CXL device 7; 8 represents a CXL device 8; 9 represents a CXL device 9; 10 represents a CXL device 10; 11 represents a CXL device 11. In the present embodiment, devices connected to the ports in the target CXL switches are recorded by means of the node adjacency table, so that port connection information can be quickly found, thereby facilitating fast construction of a host system.

In an exemplary embodiment, before the target processor is determined from the plurality of devices on the CXL bus according to the acquired host configuration information, the method further comprises: port information of a port provided in each of the plurality of target CXL switches is acquired, wherein the plurality of target CXL switches are switches supporting the open interconnect standard CXL protocol, the devices are allowed to be connected to the target CXL switches, and the plurality of target CXL switches are allowed to be connected to each other; and a port configuration information table of each target CXL switch is constructed according to the port information of the port provided in each target CXL switch.

Figure 7:
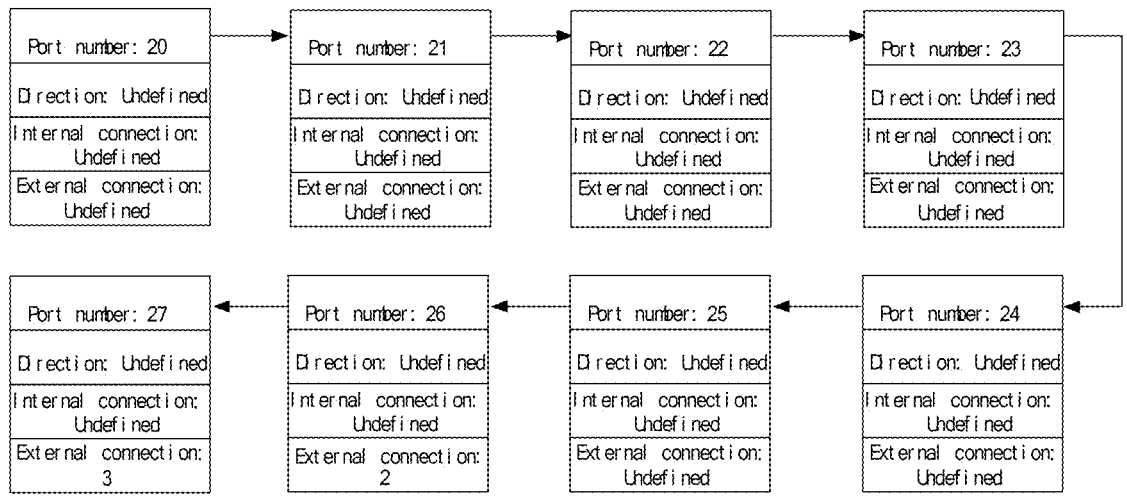
FIG. 7 shows a port configuration information table of a CXL Switch 1 according to an embodiment of the present disclosure.
Figure 8:
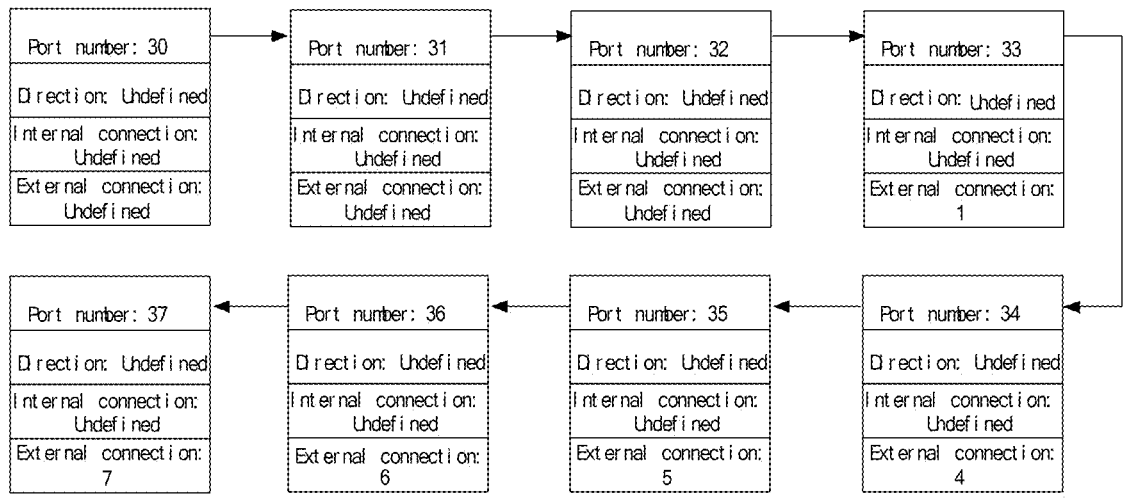
FIG. 8 shows a port configuration information table of a CXL Switch 2 according to an embodiment of the present disclosure.
Figure 9:
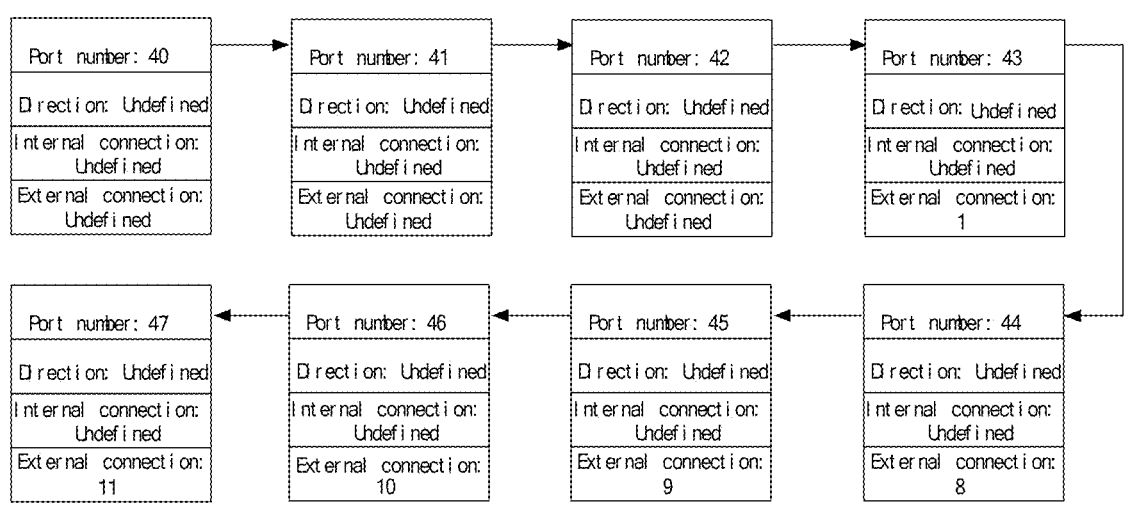
FIG. 9 shows a port configuration information table of a CXL Switch 3 according to an embodiment of the present disclosure.

Optionally, the port configuration information table of each target CXL switch comprises at least one of the following: physical port information of each target CXL switch connected to the device, a connection relationship between each target CXL switch and each device, and port information of a virtual port of a virtual target CXL switch provided in each target CXL switch, and a connection relationship between the virtual target port of the virtual CXL switch provided in each target CXL switch and each device. In the present embodiment, a port configuration information table is established for each target CXL switch at the same time; and information such as the port number of a virtual switch and a connection situation between ports are recorded. As shown in FIG. 7, it is a port configuration information table of a target CXL Switch 1, which includes the serial number of each port in the CXL Switch 1, the connection direction of the port, the connection state with other CXL switches, and the connection state with an external CXL device. FIG. 8 shows a port configuration information table of a target CXL Switch 2; FIG. 9 shows a port configuration information table of a target CXL Switch 3, the content of the port configuration information table being similar to that of the CXL Switch 1. In the present embodiment, the information of the port connection in a target CXL switch is recorded by means of the port configuration information table, so that port information can be quickly found, thereby facilitating fast construction of a host system.

Figure 10:
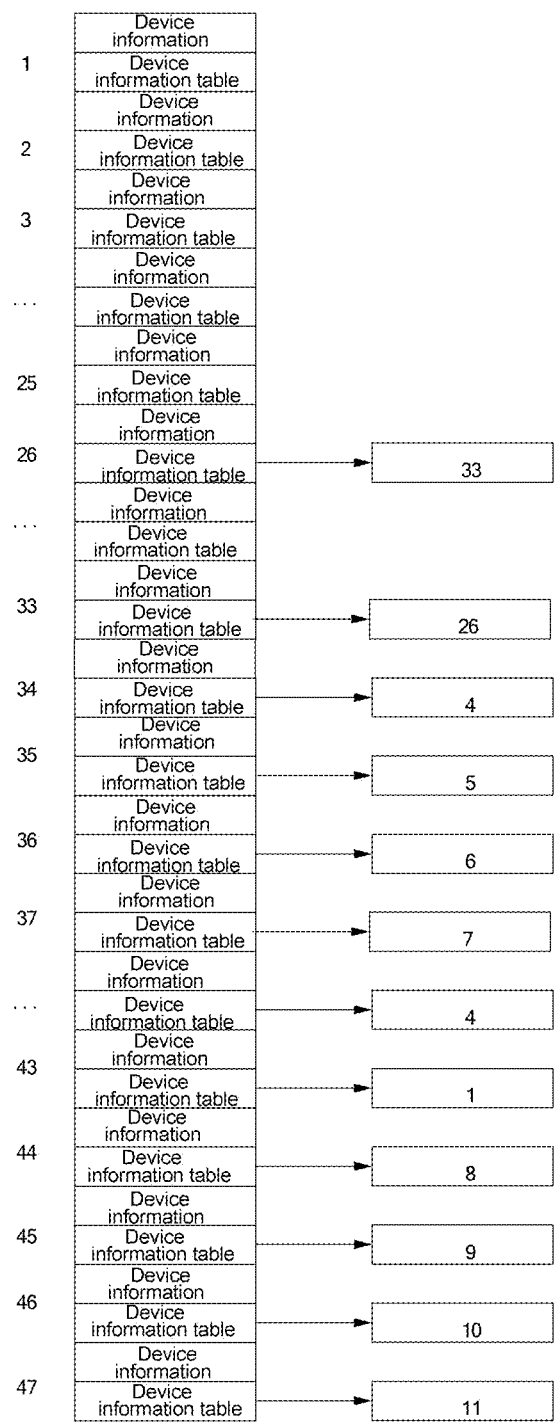
FIG. 10 is a schematic diagram of a real-time connection relationship of devices according to an embodiment of the present disclosure.

Optionally, after the node adjacency table is constructed using the CXL connection information sent by each target CXL switch, the method further comprises: a real-time node adjacency table is constructed using the node adjacency table and the port configuration information table of each target CXL switch, wherein the real-time node adjacency table comprises a real-time connection relationship between each device and a corresponding target CXL switch. In the present embodiment, the real-time node adjacency table is mainly used for recording a connection relationship of a current CXL device; according to the node adjacency table and the port configuration information table of each target CXL switch, a CXL Switch is regarded as a multi-port node device; and a real-time node adjacency table is established, as shown in FIG. 10, the real-time node adjacency table comprises device information and a real-time connection relationship of the device. With reference to FIG. 5, numbers 1-3 are used to represent the reference signs of CXL switches; numbers 4-11 are used to represent the reference signs of CXL devices; and numbers 12-47 are used to represent the reference signs corresponding to the CXL switches and CXL devices. For example, a port 26 (PPB) in the CXL switch 1 is connected to a port 33 (PPB) in the CXL switch 2; and a port 47 (PPB) in the CXL switch 3 is connected to a CXL device 11.

In the present embodiment, the connection relationship between the devices can be recorded in real time by means of the real-time node adjacency table, which facilitates the search and configuration of devices.

Optionally, after a target CXL switch is configured using the M target CXL devices, the target processor and a shortest connection path between the target CXL device and the target processor, to configure a host system, the target CXL switch being a switch supporting the open interconnect standard CXL protocol, the method further comprises: the real-time node adjacency table is updated using the shortest connection path between the target CXL device and the target processor. The real-time node adjacency table is updated in real time, so as to provide real-time connection information for the configuration of the next host system.

Figure 11:
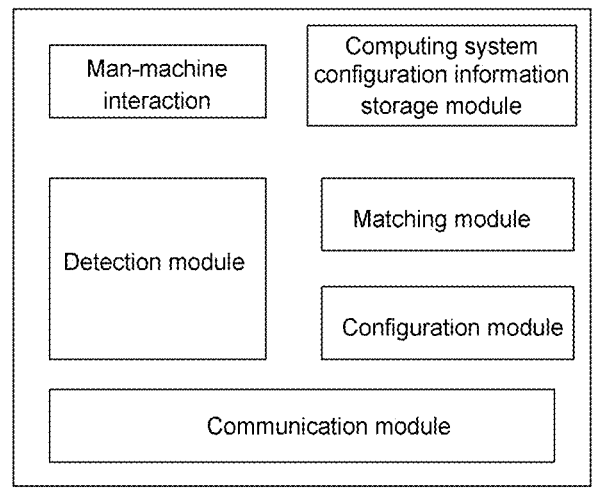
FIG. 11 is a structural block diagram of an apparatus for constructing a computing system according to an embodiment of the present disclosure.

The present disclosure will be described below in conjunction with optional embodiments:

In the embodiments of the present disclosure, a computing system is constructed by configuring a plurality of host systems. As shown in FIG. 11, the apparatus for constructing a computing system comprises: a man-machine module, a computing system configuration information storage module, a detection module, a matching module, a configuration module and a communication module.

The man-machine module is configured to provide a man-machine interface for a user to define, as required, a computing system to be configured, and store the configuration of the host system by the user into the computing system configuration information storage module.

The configuration information storage module is configured to store the configuration of a user on a computing system, comprising the composition of each host system, such as CPU node information, Mem node information and IO node information.

The detection module is configured to detect CXL, by means of a management network and using a communication interface, device information, CXL Switch information, information of a connection between the CXL device and the CXL Switch, etc.; and establish a device information table, a node adjacency table, a CXL Switch port configuration information table, etc.

The matching module is configured to read the configuration information of each host system from the configuration information storage module of the computing system, find a target CPU of each host system, then find other suitable CXL devices on the basis of the principle of the shortest connection path, and send the configurations of various CXL devices and the configuration information of the CXL Switch to the configuration module, for the configuration module to send a configuration command to the CXL devices and the CXL Switch by means of the communication module.

The configuration module is configured to receive the device configuration information sent from the matching module, convert the configuration information into an appropriate command word complying with the specifications, and send the command word by means of the communication module.

The communication module is configured to manage communications between the CXL devices, including transmitting and receiving data.

The apparatus for construction configures each host system by:

S1: configuration information, sent by a user, of a computing system is stored in a memory or a Flash or a magnetic disk;

S2: configuration information of a host system is read, by the matching module, from configuration information of a computing system; preset configuration information of a host system is acquired from the configuration information of the host system; preset configuration information is organized and sequenced same according to a linked table; a CPU is ranked at the first node; a manufacturer, a product ID, and a device classification ID, and other necessary device information are matched with the CPU information of the host system; a device that has not yet been configured is selected as a target CPU of the host system; then the target CPU is marked as being configured in the device information table;

S3: a CXL device is matched and selected, by the matching module, for the host system according to the principle of the shortest connection path, comprising the following steps:

S31: information of the CXL device is read from the device information table; the device information table is searched according to the manufacturer ID, the product ID, the device classification ID and the other necessary device information of the CXL device; and a matched CXL device is foud from CXL devices which have not been configured, wherein there may be a plurality of matched CXL devices; and when there are a plurality of matched devices, a matched target CXL device is determined according to the principle of the shortest connection path;

S32: finding, for each matched CXL device to be selected, a shortest connection path connected to a target processor, comprising:

S321: an optional node adjacency graph is constructed; a copy of a real-time node adjacency table is copied; then, according to a CXL Switch port configuration information table, all possible connections of internal nodes of the CXL Switch are supplemented and a new digraph is established; and the real-time node adjacency table is updated according to the new directed graph;

S322: the matched CXL devices to be selected are set as vertexes in the directed graph, the edge weight being Wij (representing the edge weight between a node i and a node j); in the present embodiment, all Wij=1, and the value of Wij may also be set according to factors such as performance and bandwidth;

S323: starting from the CXL device to be selected, the shortest connection path is found in the directed graph, and then the connection condition and path length of the shortest connection path are recorded; the algorithm for determining the shortest connection path may be a Dijkstra algorithm or other algorithms;

S33: the path distances of each matched CXL device are compared by the matching module; a CXL device with the shortest path distance is selected as a target CXL device of the host system; and the shortest connection path between the target CXL device and the target CPU is recorded; then the target CXL device is marked as being configured in the device information table; and a configuration instruction is further sent to a relevant CXL Switch (a target CXL switch) according to the shortest connection path, so as to configure the CXL Switch, and then the configuration information of the CXL Switch is updated and stored; and the real-time node adjacency table is updated according to the latest configuration condition.

Figure 12:
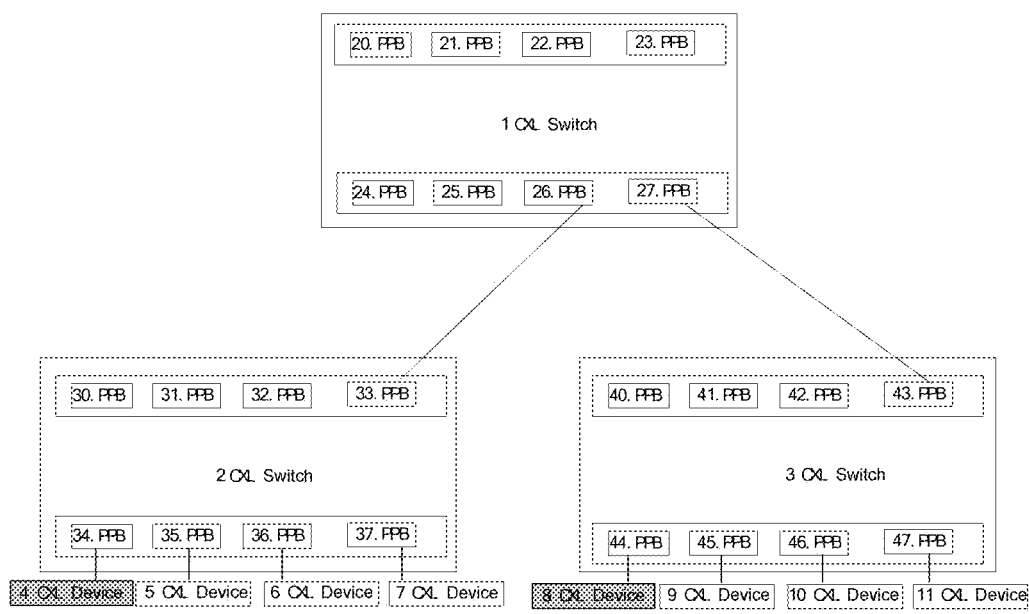
FIG. 12 is a schematic diagram of a search matching CXL device according to an embodiment of the present disclosure.
Figure 13:
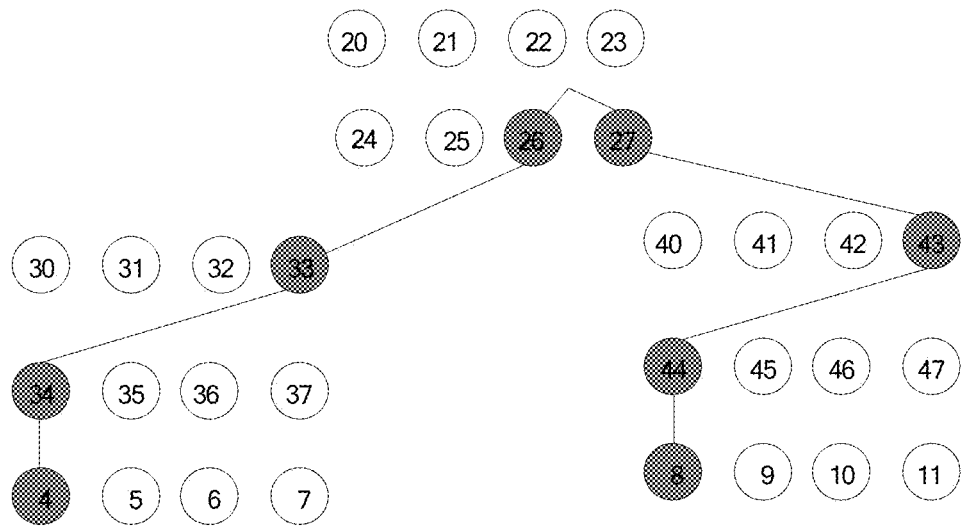
FIG. 13 is diagram of a connection relationship according to an embodiment of the present disclosure.

As shown in FIG. 12, assume that a CXL device 4 is a target CPU of the host system, the found CXL device matching the target CPU is a node 8. The connection paths between the node 8 and the node 4 are searched, and the distances between the connection paths are calculated. It comprises the following steps:

S1201: node connection diagrams are constructed, a node connection diagram for possible connection conditions of all the internal nodes of the CXL Switch is established, and a real-time node adjacency table is correspondingly modified, Since starting from the node 8, only the node 44 is connected to the node 8, the node 44 is a node of the CXL switch;

S1202: internal ports of the CXL switch are searched for a port connected to the CXL switch, wherein only a node 43 is currently connected to an external CXL switch, then it is found that a node 27 is connected to the node 43, and the node 27 is a node of the CXL switch; then the internal ports of the CXL switch are searched for a port connected to the CXL switch or a node connected to the node 4, wherein it is found that only a node 26 is connected to an external CXL switch, a node 33 is connected to a node 26, and a node 33 is a node of the CXL switch; then internal ports of the CXL switch are searched for a port connected to the CXL switch or a node connected to the node 4, it is found that a node 34 is connected to the node 4, and a node connection diagram as shown in FIG. 13 is established;

S1203: all the edge weights of the node connection diagram are set as 1, and then the distance between the shortest connection paths is calculated using the Dijkstra algorithm, wherein since there is only one path between the node 8 and the node 4, the path 8→44→43→27→26→33→34→4 is the shortest connection path, according to the connection conditions of the ports between the shortest connection path and the nodes, a configuration command is sent to the CXL Switch 1, the CXL Switch 2 and the CXL Switch 3, to connect the port 44 to the port 43, the port 26 to the port 27, and the port 33 to the port 34, the device 8 is connected to the CPU node 4, constructing a host system;

S4: the configuration information of other CXL devices of the host system is read; S3 is repeated until all the CXL devices in the host system are matched; the matched CXL devices are marked as being configured in the device information table; and the configuration of the CXL is completed, thereby completing the construction of the host system;

S5: the configuration information of a computing system is read to acquire configuration information of a next host system, until all host systems are matched and configured, thereby constructing a computing system by a plurality of host systems.

In conclusion, with respect to the demand of automatically constructing a computing system based on a CXL architecture, the present embodiment provides a method for automatically constructing a computing system. By reading a computing system configuration of a user, automatically detecting a CXL device, finding a suitable CXL device according to a shortest connection path method, and configuring a CXL Switch according to the shortest connection path, a computing system required by the user is constructed.

From the description of the described embodiments, a person skilled in the art would have been able to clearly understand that the method in the described embodiments may be implemented by using software and necessary general hardware platforms, and of course may also be implemented using hardware, but in many cases, the former is a better embodiment. Based on such understanding, the essence of technical solution of the embodiments of the embodiments of the present disclosure, or in other words, the part of the technical solutions making contributions to the prior art, may be embodied in the form of a software product stored in a Non-Transitory readable storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

The embodiment further provides a computing system. The computing system comprises a plurality of host systems, and the host systems are determined by means of the described method.

An apparatus for configuring a host system is also provided in the present embodiment. The apparatus is configured to implement the foregoing embodiments and optional implementations, which has been described and will not be described repeatedly here. As used below, the term "module" may implement a combination of software and/or hardware of predetermined functions. Although the apparatus described in the following embodiments is preferably implemented in software, implementation in hardware or a combination of software and hardware is also possible and conceived.

Figure 14:
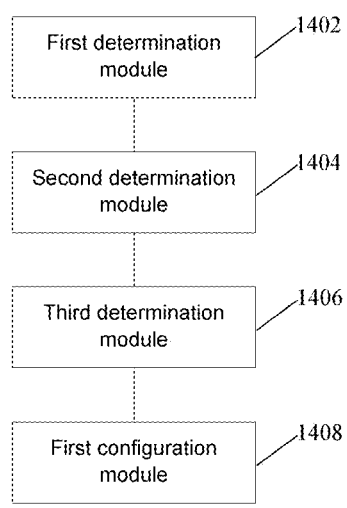
FIG. 14 is a structural block diagram of an apparatus for configuring a host system according to an embodiment of the present disclosure.

FIG. 14 is a structural block diagram of an apparatus for configuring a host system according to an embodiment of the present disclosure. As shown in FIG. 14, the apparatus includes:

a first determination module 1402, configured to determine, according to acquired host configuration information, a target processor from a plurality of devices on a CXL bus, wherein the plurality of devices are devices supporting an open interconnect standard CXL protocol, and the target processor is a device in an idle state among the plurality of devices;

a second determination module 1404, configured to determine, from the plurality of devices, a CXL device corresponding to each piece of the device configuration information according to M pieces of device configuration information included in the host configuration information, wherein one piece of device configuration information corresponds to the plurality of CXL devices, the CXL device is a device in an idle state among the plurality of devices, and M is a natural number greater than or equal to 1;

a third determination module 1406, configured to determine a target CXL device from CXL devices corresponding to each piece of the device configuration information, to obtain M target CXL devices, wherein in a connection path between a CXL device corresponding to each piece of configuration information and the target processor, the determined connection path between the target CXL device and the target processor is the shortest; and a first configuration module 1408, configured to configure a target CXL switch using the M target CXL devices, the target processor and a shortest connection path between the target CXL device and the target processor, to configure a host system, the target CXL switch being a switch supporting the open interconnect standard CXL protocol.

According to the described apparatus, since a target processor is determined from a plurality of devices on a CXL bus according to acquired host configuration information; a CXL device corresponding to each piece of the device configuration information is determined from the plurality of devices according to M pieces of device configuration information included in the host configuration information; a target CXL device is determined from CXL devices corresponding to each piece of device configuration information, to obtain M target CXL devices; and a target CXL switch is configured using the M target CXL devices, the target processor and a shortest connection path between the target CXL device and the target processor, to configure a host system. In this way, a proper device is automatically searched for based on a configuration requirement to construct a host system, thereby achieving an objective of automatically constructing a computing system without the need for manual configuration by users. Therefore, the problem in the related art that the efficiency of configuring a computing system is low can be solved, achieving the effect of improving the efficiency of configuring a computing system.

In an exemplary embodiment, the first determination module comprises:
- a first acquisition unit, configured to acquire processor information from the host configuration information;
- a first search unit, configured to search a device information table for device information matching the processor information, wherein the device information table comprises device information of the plurality of devices; and
- a first determination unit, configured to determine the target processor from the plurality of devices according to the device information matching the processor information.

In an exemplary embodiment, the second determination module comprises:
- a second search unit, configured to search the device information table for device information matching each piece of the device configuration information, wherein the device information table comprises device information of the plurality of devices; and
- a second determination unit, configured to determine a corresponding CXL device from the plurality of devices according to the device information matching each piece of the device configuration information.

In an exemplary embodiment, the second determination module comprises:
- a first configuration unit, configured to configure a node connection diagram between the CXL device corresponding to each piece of the device configuration information and the target processor, wherein the node connection diagram comprises a connection relationship and a connection port between the CXL device and the target processor; and
- a third determination unit, configured to determine a target CXL device from the CXL devices corresponding to each piece of the device configuration information using the node connection diagram, to obtain M target CXL devices.

In an exemplary embodiment, the first configuration unit comprises:
- a first determination subunit, configured to determine a first CXL switch corresponding to the target processor, wherein the first CXL switch is one of a plurality of target CXL switches connected on the CXL bus, and the target CXL switch is a switch supporting the open interconnect standard CXL protocol;
- a second determination subunit, configured to determine a second CXL switch corresponding to each of the CXL devices, wherein the second CXL switch is one switch among the plurality of target CXL switches;
- a third search subunit, configured to search a real-time node adjacency table for a first connection relationship between the target processor and the first CXL switch, a second connection relationship between each of the CXL devices and a corresponding second CXL switch, and a third connection relationship between the first CXL switch and a second CXL switch corresponding to each of the CXL devices;
- a fourth search subunit, configured to search a port configuration information table of the first CXL switch for first port information of a connection between the target processor and the first CXL switch;
- a fifth search subunit, configured to search a port configuration information table of each of the CXL devices and a corresponding second CXL switch for second port information of a connection between each of the CXL devices and the corresponding second CXL switch; and
- and a first configuration sub-element, configured to use the first connection relationship, the second connection relationship, the third connection relationship, the first port information and the second port information to configure a node connection diagram between the CXL device and the target processor corresponding to each piece of the device configuration information.

In an exemplary embodiment, the first port information includes first physical port information and first virtual port information that are connected between the target processor and the first CXL switch, where the first virtual port information is port information of a virtual port in a virtual CXL switch provided in the first CXL switch.

In an exemplary embodiment, the second port information includes second physical port information and second virtual port information that are connected between each of the CXL devices and a corresponding second CXL switch, and the second virtual port information is port information of a virtual port in a virtual CXL switch provided in the second CXL switch.

In an exemplary embodiment, the node connection diagram is a diagram including a connection direction, a vertex in the node connection diagram includes the CXL device and the target processor, an edge in the node connection diagram is a preset value, and the edge is used for connecting the CXL device and the target processor.

In an exemplary embodiment, the third determination unit comprises:

a first calculating subunit, configured to calculate, by using a preset algorithm, a shortest connection path among a plurality of connection paths in the node connection diagram corresponding to each piece of the device configuration information;

a first determination subunit, configured to determine one target CXL device from the shortest connection path corresponding to each piece of the device configuration information, to obtain M target CXL devices.

In an exemplary embodiment, the first configuration module comprises:

a first sending unit, configured to send a configuration instruction to the first CXL switch corresponding to the target processor, wherein the configuration instruction comprises the shortest connection path between the target CXL device and the target processor, the first CXL switch is one of the plurality of CXL switches provided in the CXL bus, and the plurality of the CXL switches are switches supporting the open interconnect standard CXL protocol; and a first connection unit, configured to connect to the shortest connection path by means of the first CXL switch, to configure the host system.

In an exemplary embodiment, the apparatus further comprises: a first acquisition module, configured to, before determining, according to the acquired host configuration information, the target processor from the plurality of devices connected on the CXL bus, acquire port information of a port provided in each of the plurality of CXL switches, wherein the plurality of CXL switches are switches supporting the open interconnect standard CXL protocol, the devices are allowed to be connected to the CXL switches, and the plurality of CXL switches are allowed to be connected to each other; and a first construction module, configured to construct a device information table using the device information of the plurality of CXL devices and the switch information of the plurality of target CXL switches.

In an exemplary embodiment, the device information of each device includes at least one of the following: identifier information of a manufacturer of the device, identifier information of the device, and classification information of the device. The switch information of each of the CXL switches comprises at least one of the following: identifier information of a manufacturer of each CXL switch, identifier information of each CXL switch, and classification information of each CXL switch.

In an exemplary embodiment, the apparatus further comprises:

a first acquisition module, configured to, before determining, according to the acquired host configuration information, the target processor from the plurality of devices connected on the CXL bus, acquire port information of a port provided in each of the plurality of CXL switches, wherein the plurality of CXL switches are switches supporting the open interconnect standard CXL protocol, the devices are allowed to be connected to the CXL switches, and the plurality of CXL switches are allowed to be connected to each other; and a second construction module, configured to construct a port configuration information table of each target CXL switch according to the port information of the port provided in each target CXL switch.

In an exemplary embodiment, the port configuration information table of each CXL switch comprises at least one of the following: physical port information of each CXL switch connected to the device, a connection relationship between each CXL switch and each device, and port information of a virtual port of a virtual CXL switch provided in each CXL switch, and a connection relationship between the virtual port of the virtual CXL switch provided in each CXL switch and each device.

In an exemplary embodiment, the apparatus further comprises:

a first sending module, configured to send an information acquisition instruction to the CXL switches before determining, according to the acquired host configuration information, the target processor from the plurality of devices on the CXL bus;

a first receiving module, configured to receive CXL connection information sent by each CXL switch, wherein the CXL connection information comprises connection relationship information between each CXL switch and the device; and a third construction module, configured to construct a node adjacency table using the CXL connection information sent by each CXL switch, wherein the node adjacency table comprises a connection relationship between each device and the corresponding CXL switch.

In an exemplary embodiment, the apparatus further comprises:

a fourth construction module, configured to, after constructing the node adjacency table using the CXL connection information sent by each CXL switch, construct a real-time node adjacency table using the node adjacency table and the port configuration information table of each CXL switch, wherein the real-time node adjacency table comprises a real-time connection relationship between each device and a corresponding CXL switch.

In an exemplary embodiment, the apparatus further comprises: an update module, configured to, after configuring the host system using the M target CXL devices and the target processor, update the real-time node adjacency table using the shortest connection path between the target CXL device and the target processor.

It should be noted that the modules above may be implemented by software or hardware, and the latter may be implemented in the following manner, but is not limited thereto. All the modules above are located in the same processor; or all the modules above are located in different processors in any arbitrary combination manner.

An embodiment of the present disclosure further provides a non-transitory computer readable storage medium storing a computer program, wherein the computer program is configured to execute, when running, the steps in any one of the described method embodiments.

In an exemplary embodiment, the non-transitory computer readable storage medium may include, but is not limited to, any medium that can store a computer program, such as a USB flash drive, a Read-Only Memory (ROM), a Random Access Memory (RAM), a removable hard disk, a magnetic disk, or an optical disc.

Figure 15:
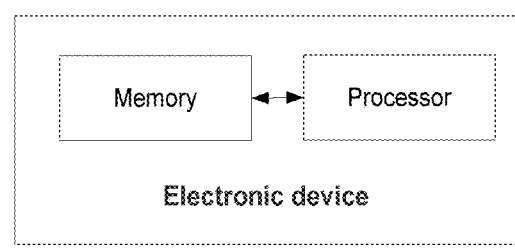
FIG. 15 is a schematic diagram of an electronic device according to an embodiment of the present disclosure.

An embodiment of the present disclosure further provides an electronic device. FIG. 15 is a schematic diagram of an optional electronic device according to an embodiment of the present disclosure. As shown in FIG. 15, the electronic device includes one or more processors; A memory configured to store one or more programs, wherein when the one or more programs are executed by one or more processors, the one or more processors are configured to execute the programs, and the programs are configured to execute, when running, the method for running the system of the baseboard management controller mentioned above.

In an exemplary embodiment, the electronic device can further comprise a transmission device and an input/output device, wherein the transmission device is connected to the processor, and the input/output device is connected to the processor.

For examples in the present embodiment, reference can be made to the examples described in the described embodiments and exemplary embodiments, and thus they will not be repeated again in the present embodiment.

Obviously, those skilled in the art should understand that the modules or steps in the embodiments of the present disclosure can be implemented by using a general computing device, and they can be integrated in a single computing device, and can also be distributed over a network consisting of a plurality of computing devices. They may be implemented by using executable program codes of the computing devices. Thus, they can be stored in a storage device and executed by the computing devices. Furthermore, in some cases, the shown or described steps may be executed in an order different from that described here, or they can be respectively implemented by individual Integrated Circuit modules, or they can be implemented by making a plurality of the modules or steps into a single Integrated Circuit module. Hence, the embodiments of the present disclosure are not limited to any specific combinations of hardware and software.

The described content merely relates to optional embodiments of the present disclosure and is not intended to limit the present disclosure. For a person skilled in the art, the embodiments of the present disclosure may have various modifications and variations. Any modifications, equivalent replacements, improvements, etc. made within the principle of the embodiments of the present disclosure shall all belong to the scope of protection of the embodiments of the present disclosure.

What is claimed is:

1. A method for configuring a host system, comprising:
   determining, according to acquired host configuration information, a target processor from a plurality of devices on a CXL bus, wherein the plurality of devices are devices supporting an open interconnect standard CXL protocol, and the target processor is a device in an idle state among the plurality of devices;
   determining, from the plurality of devices, a CXL device corresponding to each piece of the device configuration information according to M pieces of device configuration information included in the host configuration information, wherein one piece of device configuration information corresponds to the plurality of CXL devices, the CXL device is a device in an idle state among the plurality of devices, and M is a natural number greater than or equal to 1;
   determining a target CXL device from CXL devices corresponding to each piece of the device configuration information, to obtain M target CXL devices, wherein in a connection path between a CXL device corresponding to each piece of configuration information and the target processor, the determined connection path between the target CXL device and the target processor is the shortest; and
   configuring a target CXL switch using the M target CXL devices, the target processor and a shortest connection path between the target CXL device and the target processor, to configure a host system, the target CXL switch being a switch supporting the open interconnect standard CXL protocol.

2. The method according to claim 1, wherein determining, according to acquired host configuration information, a target processor from a plurality of devices on a CXL bus comprises:
   acquiring processor information from the host configuration information;
   searching a device information table for device information matching the processor information, wherein the device information table comprises device information of the plurality of devices; and
   determining the target processor from the plurality of devices according to the device information matching the processor information.

3. The method according to claim 1, wherein determining, from the plurality of devices, a CXL device corresponding to each piece of the device configuration information according to M pieces of device configuration information included in the host configuration information comprises:
   searching the device information table for device information matching each piece of the device configuration information, wherein the device information table comprises device information of the plurality of devices; and
   determining a corresponding CXL device from the plurality of devices according to the device information matching each piece of the device configuration information.

4. The method according to claim 1, wherein determining a target CXL device from CXL devices corresponding to each piece of the device configuration information, to obtain M target CXL devices comprises:
   configuring a node connection diagram between the CXL device corresponding to each piece of the device configuration information and the target processor, wherein the node connection diagram comprises a connection relationship and a connection port between the CXL device and the target processor; and
   determining a target CXL device from the CXL devices corresponding to each piece of the device configuration information using the node connection diagram, to obtain M target CXL devices.

5. The method according to claim 4, wherein configuring the node connection diagram between the CXL device corresponding to each piece of the device configuration information and the target processor comprises:
   determining a first CXL switch corresponding to the target processor, wherein the first CXL switch is one of a plurality of target CXL switches connected on the CXL bus, and the target CXL switch is a switch supporting the open interconnect standard CXL protocol;
   determining a second CXL switch corresponding to each of the CXL devices, wherein the second CXL switch is one switch among the plurality of target CXL switches;
   searching a real-time node adjacency table for a first connection relationship between the target processor and the first CXL switch, a second connection relationship between each of the CXL devices and a corresponding second CXL switch, and a third connection relationship between the first CXL switch and a second CXL switch corresponding to each of the CXL devices;
   searching a port configuration information table of the first CXL switch for first port information of a connection between the target processor and the first CXL switch;

searching a port configuration information table of each of the CXL devices and a corresponding second CXL switch for second port information of a connection between each of the CXL devices and the corresponding second CXL switch; and configuring a node connection diagram between the CXL device and the target processor corresponding to each piece of the device configuration information using the first connection relationship, the second connection relationship, the third connection relationship, the first port information and the second port information.

6. The method according to claim 5, wherein the first port information comprises first physical port information and first virtual port information of the connection between the target processor and the first CXL switch, and the first virtual port information is port information of a virtual port in a virtual CXL switch provided in the first CXL switch.

7. The method according to claim 5, wherein the second port information comprises second physical port information and second virtual port information of the connection between each of the CXL devices and the corresponding second CXL switch, and the second virtual port information is port information of a virtual port in a virtual CXL switch provided in the second CXL switch.

8. The method according to claim 4, wherein the node connection diagram is a directed graph, the vertexes in the node connection diagram comprise the CXL devices and the target processor, the edge weights of edges in the node connection diagram are preset values, and the edges are used for connecting the CXL devices and the target processor.

9. The method according to claim 4, wherein determining a target CXL device from CXL devices corresponding to each piece of the device configuration information using the node connection diagram, to obtain M target CXL devices comprises:

calculating a shortest connection path among a plurality of connection paths in the node connection diagram corresponding to each piece of the device configuration information; and determining one target CXL device from the shortest connection path corresponding to each piece of the device configuration information, to obtain M target CXL devices.

10. The method according to claim 1, wherein configuring the target CXL switch using the M target CXL devices, the target processor and a shortest connection path between the target CXL device and the target processor, to configure the host system comprises:

sending a configuration instruction to the first CXL switch corresponding to the target processor, wherein the configuration instruction comprises the shortest connection path between the target CXL device and the target processor, the first CXL switch is one of the plurality of target CXL switches provided in the CXL bus, and the plurality of the target CXL switches are switches supporting the open interconnect standard CXL protocol; and connecting to the shortest connection path by means of the first CXL switch, to configure the host system.

11. The method according to claim 1, wherein before determining, according to the acquired host configuration information, the target processor from the plurality of devices on the CXL bus, the method further comprises:

acquiring device information of the plurality of devices and switch information of the plurality of target CXL switches connected in the CXL bus, wherein the plurality of target CXL switches are switches supporting the open interconnect standard CXL protocol, the devices are allowed to be connected to the target CXL switches, and the plurality of target CXL switches are allowed to be connected to each other; and constructing a device information table using the device information of the plurality of CXL devices and the switch information of the plurality of target CXL switches.

12. The method according to claim 11, wherein the device information of each device comprises at least one of the following: identifier information of the manufacturer of the device, identifier information of the device, and classification information of the device; and the switch information of each of the target CXL switches comprises at least one of the following: identifier information of a manufacturer of each target CXL switch, identifier information of each target CXL switch, and classification information of each target CXL switch.

13. The method according to claim 1, wherein before determining, according to the acquired host configuration information, the target processor from the plurality of devices on the CXL bus, the method further comprises:

acquiring port information of a port arranged in each of the plurality of target CXL switches, wherein the plurality of target CXL switches are switches supporting the open interconnect standard CXL protocol, the devices are allowed to be connected to the target CXL switches, and the plurality of target CXL switches are allowed to be connected to each other; and constructing a port configuration information table of each target CXL switch according to the port information of the port provided in each target CXL switch.

14. The method according to claim 13, wherein the port configuration information table of each target CXL switch comprises at least one of the following: physical port information of each target CXL switch connected to the device, a connection relationship between each target CXL switch and each device, and port information of a virtual port of a virtual CXL switch provided in each target CXL switch, and a connection relationship between the virtual port of the virtual CXL switch provided in each target CXL switch and each device.

15. The method according to claim 13, wherein before determining, according to the acquired host configuration information, the target processor from the plurality of devices connected on the CXL bus, the method further comprises:

sending an information acquisition instruction to the plurality of target CXL switches;

receiving CXL connection information sent by each target CXL switch, wherein the CXL connection information comprises connection relationship information between each target CXL switch and the device; and constructing a node adjacency table using the CXL connection information sent by each target CXL switch, wherein the node adjacency table comprises a connection relationship between each device and the corresponding target CXL switch.

16. The method according to claim 15, wherein after constructing the node adjacency table using the CXL connection information sent by each target CXL switch, the method further comprises:

constructing a real-time node adjacency table using the node adjacency table and the port configuration information table of each target CXL switch, wherein the real-time node adjacency table comprises a real-time connection relationship between each device and a corresponding target CXL switch.

17. The method according to claim 16, wherein after configuring the target CXL switch using the M target CXL devices, the target processor and a shortest connection path between the target CXL device and the target processor, to configure the host system, the target CXL switch being a switch supporting the open interconnect standard CXL protocol, the method further comprises:
   updating the real-time node adjacency table using the shortest connection path between the target CXL device and the target processor.

18. A computing system, comprising a plurality of host systems, the host systems being configured by the method as claimed in claim 1.

19. A non-transitory computer readable storage medium, wherein the non-transitory computer readable storage medium stores a computer program, and the computer program is configured to cause, when the computer program is executed by a processor, the processor to perform the steps of the method as claimed in claim 1.

20. An electronic device, comprising a memory, a processor, and a computer program stored in the memory and executable on the processor, wherein the processor is configured to execute the computer program to perform the steps of the method as claimed in claim 1.

\* \* \* \* \*